June 22, 1926.

L. F. DAY ET AL 1,590,086

ALFALFA MEAL AND BRAN PACKER

Filed Nov. 28, 1925    4 Sheets-Sheet 1

June 22, 1926.

L. F. DAY ET AL

1,590,086

ALFALFA MEAL AND BRAN PACKER

Filed Nov. 28, 1925    4 Sheets-Sheet 2

Patented June 22, 1926.

1,590,086

UNITED STATES PATENT OFFICE.

LUTHER F. DAY AND JESSE F. BAKER, OF LAMAR, COLORADO.

ALFALFA MEAL AND BRAN PACKER.

Application filed November 28, 1925. Serial No. 71,995.

This invention relates to packers designed for use in packing corn, oats, cereal flakes, alfalfa meal, and the like products, and particularly to that form of packer wherein there is provided a cage, as it may be called, movable vertically from a receiving to a discharging position and vice versa, the cage enclosing a bag or other container and the cage as it moves upward having telescopic engagement with a packing cylinder into which the material to be fed to the packing mechanism is discharged and having therein means operating to compress or positively feed the material into the bag or other container.

One of the objects of the present invention is to provide a cage which is so formed that it may be readily opened by the operator, a bag or other container inserted, and then the cage closed, the closing of the cage acting to crimp the mouth of the bag around the lower end of a feeding sleeve.

A further object is to provide for holding the cage in a lowered and open position until the operator has placed an empty bag inside of the cage and in proper position therein, and provide means whereby the cage may then be released and caused to move upward automatically.

A still further object is to provide means for packing or feeding the material into the bag contained within the cage, which includes gearing operating as the cage descends, and particularly to provide means for automatically releasing a clutch controlling said gearing when the cage has been depressed to a predetermined point and automatically opening the cage to permit the discharge of the filled bag therefrom.

Another object is to provide means which will permit the packing cage to travel freely upward but provide sufficient resistance to the downward movement of the cage as will permit any desired weight to be packed within the sack, this resistance being adjustable.

Still another object is to provide a weight-elevated platform upon which the cage is mounted, and provide means whereby this platform may be locked in its lowered position until the cage is fully closed, thus eliminating any danger to the operator due to his attempts to close the cage while the platform is moving upward.

A further object is to improve certain details of construction and arrangement of parts as will appear more fully hereinafter.

Our invention is illustrated in the accompanying drawings, wherein:—

Figure 8 is a fragmentary rear elevation with the cage lowered;

Figure 9 is a perspective view of the stop 88 and a portion of one of the vertical frame members on which it is mounted.

Referring to these drawings, it will be seen that our grain packer includes a base plate 10 of any suitable character having a wall 11 extending around three sides of the base plate. Attached to this wall are the upwardly extending pairs of supporting bars 12 which are preferably of angle iron. These bars are connected at their upper ends by cross braces 13 or in any other suitable manner so as to constitute a rigid frame. Extending through these cross pieces 13 and mounted in bearings therein is a shaft 14 carrying pulleys 15 over which elevating cables run, as will be later stated.

Traveling between the pairs of uprights 12 is a platform 16, this platform being in the nature of a rectangular frame, this frame having projecting from its ends the laterally extending lugs 17 which are apertured for guidance upon the vertical rods 18 which are supported by the frame and particularly by the cross piece 13 at the upper end of each rod and by a cross bar 19 at the lower end of the rod.

Attached to the end walls of the platform or rectangular frame 16 are the upright members 20 which extend inward toward each other and are attached to a sleeve 21. These upright members 20 at their upper ends are provided with outwardly extending lugs 22 which engage the vertical guide rods 18. Attached to these vertical members 20 is a rectangular frame, designated generally 23, which extends upwards from the rear portion of the platform 16 and which supports the controlling levers, as will be later stated. Attached to the uprights 20 are chains or cables 24 which extend over the pulleys 15 and are each attached to a weight 25, this weight being relatively heavy and acting to urge the platform 16 and parts mounted thereon upward.

Rigidly mounted upon the posts 12 is a support 26 which has a central opening 27, and attached to the under face of this member 26 is a cylindrical feeding cylinder 28 which extends down and is at all times disposed within the sleeve 21. Operating within this feeding cylinder is any suitable feeding member such as ordinarily found in packers. This feeding member may be in the form of a plunger, but we have illustrated it as a screw or worm designated 29. This is mounted upon a shaft 30 which extends upward to a beveled gear 31 and is mounted in suitable bearings through the top bar 32 of the supporting frame, and this beveled gear wheel is engaged by a beveled gear wheel 33 mounted upon a shaft 34 in turn supported in suitable bearings by the supporting frame 32 for the gearing, which frame is suitably mounted upon the upper end of the main supporting frame. This shaft is driven by means of a belt wheel 35 mounted thereon, this belt wheel being operatively connected to the shaft through the medium of a clutch 36 which is automatically actuated to connect the shaft 34 with a source of power or disconnect it therefrom, as will be hereafter stated. We do not wish to be limited to the particular form of gearing used for driving the packer 30 nor to the particular form of packer used, for, as before remarked, this packer might be in the form of a plunger and the particular form of packer and the particular form of operating mechanism therefor does not have any part in our specific invention.

Mounted upon the platform 16 is the cage within which the bag designed to contain products is disposed. This cage consists of two sections 37 and 38, both sections being substantially alike. Each section is semi-circular in cross section and the upper end of each section is inwardly turned, as at 39. The sleeve 21 adjacent its lower end is formed with the lower flange or shoulder 40 and with the upper flange or shoulder 41, and when the two sections of the cage are closed the inwardly turned upper ends of the sections fit between these flanges or collars 40 and 41 and the paper or other bag which is disposed within the cage with its mouth surrounding the lower end of the sleeve 28 has its mouth held tightly closed by these inwardly turned upper ends of the sections 37 and 38. The lower ends of the sections 37 and 38 are provided with downwardly and outwardly projecting lugs 42 and these are pivoted upon pivot pins 43. Outward of these pivot pins 43 there are provided pivot pins 44 upon which are pivotally supported the gate sections 45 which are closed when the cage is raised and opened when the cage is lowered.

The sections 45 are provided with outwardly extending lugs 46 through which the pivot pins 44 pass. The gate sections extend beyond these pins and are provided with pins 47 which pivot the links 48. There are a pair of links to each of the gates and these links cross each other in front of and behind the sections 37 and 38 and are pivoted to the sections by pins 49. Preferably the links are formed for longitudinal adjustment whereby the top of the cage may be drawn tighter to grip the sack more firmly or adjusted to secure a less tight grip upon the sack. Thus as the two sections are closed the gates will be shifted to a horizontal position beneath the cage and as the two sections are opened the links 48 will be drawn open and cause the lifting of the outer ends of the gates and the lowering of the inner ends of the gates to thus open the gates and discharge the filled bag from within the cage. The cage is likewise provided with tongues 50 attached to one section and projecting over into overlapping engagement with the other section when the sections are closed, these tongues guiding the sections in correct alignment with each other.

For the purpose of automatically closing and opening said sections, we provide upon the rear frame 23 automatically operated levers or dogs. The lower cross bar of this frame carries upon it the upwardly extending guide 51 and has a downwardly extending lug 52 and also carries the outwardly projecting stop 53 just below the guide. Shiftably mounted upon this guide is the slide 54, and pivotally mounted upon the lug 52 is the bell crank lever 55. The approximately horizontal arm 56 of this bell crank lever projects out beyond the platform and cage and the approximately vertical arm 57 of the bell crank lever is pivotally connected to a link 58 pivoted at 59 to the slide. With this pivot pin 59 is engaged a cable 60 which extends upward and over a pulley 61 mounted in any suitable position, and the extremity of the cable carries a weight 62, this weight being relatively light and acting to urge the slide upward. The stop 53 limits the movement of the upwardly extending arm 57 of the bell crank lever to an approximately vertical position.

Obviously when the lever 56 is raised, the slide will be lowered and when it is depressed the slide will be raised. This slide has downwardly extending links 63 which are pivotally engaged at their lower ends with pivot pins 64 carried by the gates 45. Thus it will be seen that the gates will be lowered or opened by a depression of the slide and the opening movement of the gates will cause the automatic opening movement of the two sections of the cage, and that the closing of the gates will cause a closing of the cage, or vice versa, and it will also be noted that the gates are urged to a closed position and the cage to its closed position by the weight 62.

For the purpose of preventing the closing of the cage until the operator is ready, we mount upon the upper cross bar of the frame 23 the stop 65, the lower end of which is connected by a link 66 to a lever 67 disposed upon one of the vertical bars of the frame 23, this lever being mounted upon a shaft 68 which extends transversely across the platform and at its front end is supported on a bracket 69. This end of the shaft is provided with the handle 70 whereby the shaft may be oscillated. The stop 65 is urged to a vertical or stopping position by means of a spring 71. This spring is shown as attached to a member 72 which extends down from the top bar of the frame 23 in spaced relation to the guide 51 for the slide, this member being held from any movement.

Operating behind this member 72 is a laterally projectable bolt 73 which is carried by a link 74 pivoted at 75 to the upper cross bar of the frame 23. This bolt at its outer end extends through a guide 76 and the bolt is engaged by a lug 77 on the slide 54. Thus when the slide moves upward, the lug will strike the inner end of this bolt and tend to move it upward and this will swing the link 74 toward the left in Figure 8, which will act to retract the bolt from a projected position. When the platform and the cage are fully lowered, this bolt 73 is projected beneath an outwardly projecting, vertically adjustable lug or keeper 78 carried by one of the vertical supporting members 12. It will thus be seen that when the slide is fully lowered, the latch 65 will engage over the top of the slide to prevent its being raised by means of the weight 62 and the bolt 73 will be projected upward and outward into engagement beneath the keeper 78 to prevent the upward movement of the platform until the operator so desires. Now when the rock shaft 68 is actuated by the operator at the front of the machine, the latch 65 will be drawn to one side out of the path of movement of the slide 54, which will then move upward under the action of the counterweight 62. This will straighten out the link 58 and the arm 57 of the bell crank lever and shift the arm 56 of the bell crank lever downward. At the same time the upward movement of the slide will cause the gates to close and this in turn will act to close the two halves of the cage upon the bag.

It is necessary that when the cage has descended to a point where the bag is filled with meal and the gates are to be opened in order to discharge the filled bag, that the clutch 36 be shifted to release the driving connection between the gear wheel 35 and the gear 33. To this end, we mount upon the cross bar 19 the lever 79 which is pivoted at its middle and at its rear end is engaged by a spring 80 which acts to urge this end of the lever upward (see Figure 6). This end of the lever projects beneath the outer end of the arm 56 of the bell crank lever 55. The inner end of this lever is pivotally connected to an upwardly extending cam link 81, which in turn is pivotally connected to a clutch operating rod 82. The inner edge of this cam lever 81 has an upwardly and inwardly extending inclined face 83 adapted to be engaged by a pin 84 projecting from the platform, and pivoted to the upper end of the cam link 81 is a bell crank lever 85 mounted upon ears 86 carried by one of the posts 12, the other arm of this bell crank lever being adapted to engage against the stop 87 which is also mounted upon this post.

Carried upon the adjacent support 20 is a laterally projecting vertically adjustable stop 88 disposed in the path of movement of the bell crank 85. As the platform moves upward, the pin 84 strikes the inclined cam face 83 of the link 81 and shifts this link outward which, of course, lifts the clutch link 82 which operatively connects the driving pulley 35 with the gear wheel 33. At the same time this outward movement of the cam lever causes the outwardly projecting arm of the bell crank lever to turn upward and inward to a position where it is in the path of movement of the stop 88 on the cage frame and where it will be struck by this stop 88 as the cage frame descends. Therefore, when the cage frame descends and this stop 88 strikes this bell crank lever, it will turn the horizontal arm thereof downward, throwing the link 81 inward and downward, and shifting the clutch to a position where it will stop the transmission of power to the packer shaft 30. The spring 80 acts to urge the cam link 81 downward, and as soon as the point of pivotal connection 81$^a$ of the cam link with the bell crank lever 85 passes the pivotal center of the bell crank 85, the spring will act to throw the bell crank entirely down to the position shown in Figure 6 and the cam link entirely down. When the platform rises, however, it throws the pivot 81 into a position immediately above the pivotal center for the bell crank 85 and, therefore, the spring 80 will have no effect and will not act until the stop 88 has again struck the horizontal portion of the bell crank lever and thrown it so as to shift the pivotal centers past each other.

Figure 1:
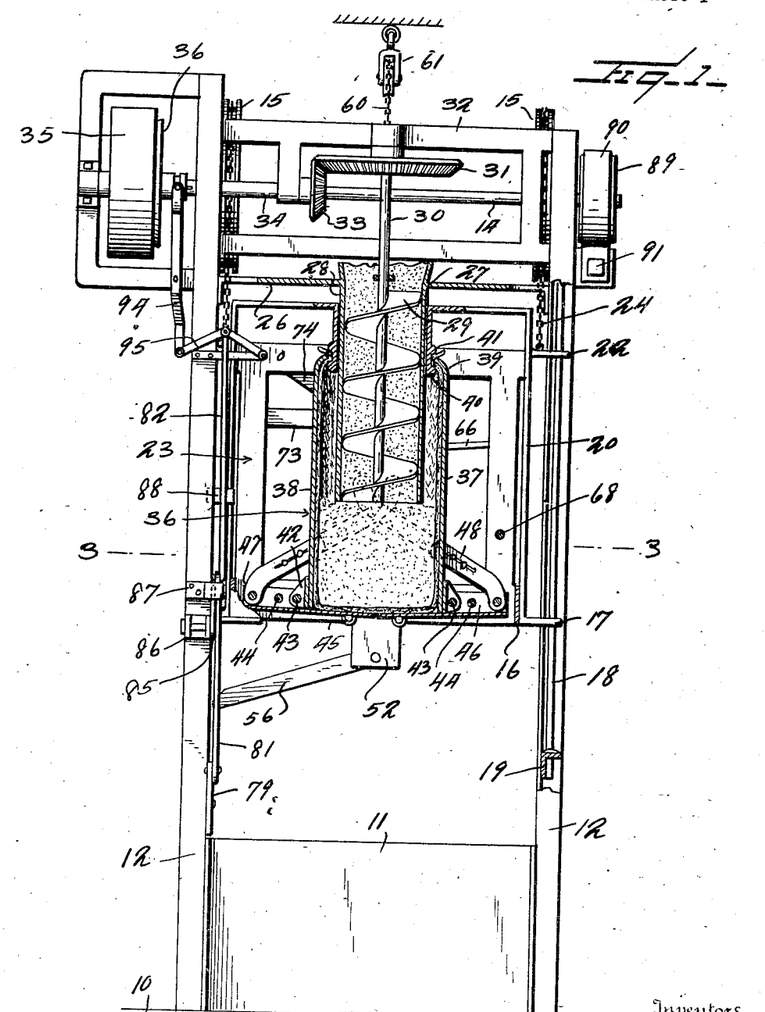
Figure 1 is a front elevation partly in section of a bag filling machine constructed in accordance with our invention.
Figure 2:
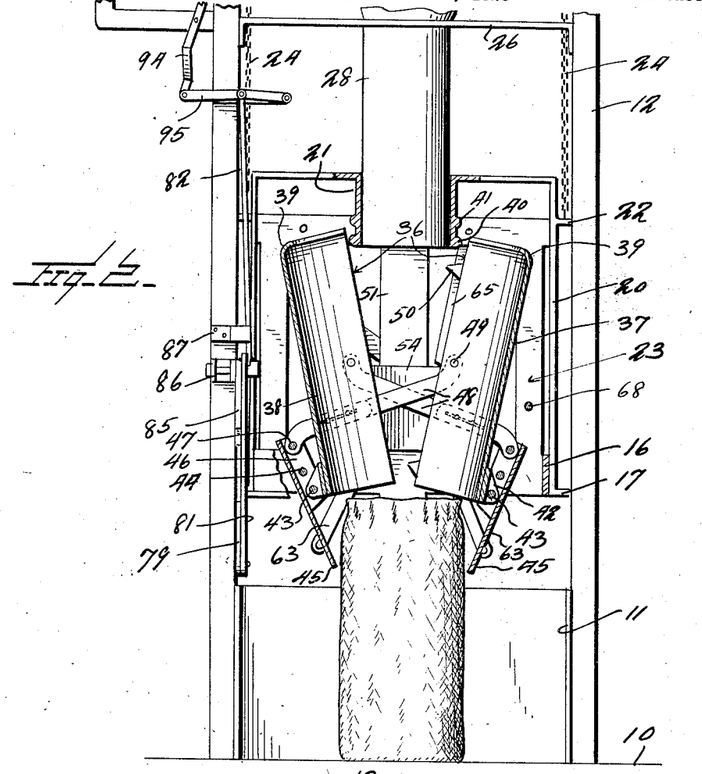
Figure 2 is an elevation partly in section of the lower portion of the machine showing the cage open and the filled bag dropped out.
Figure 3:
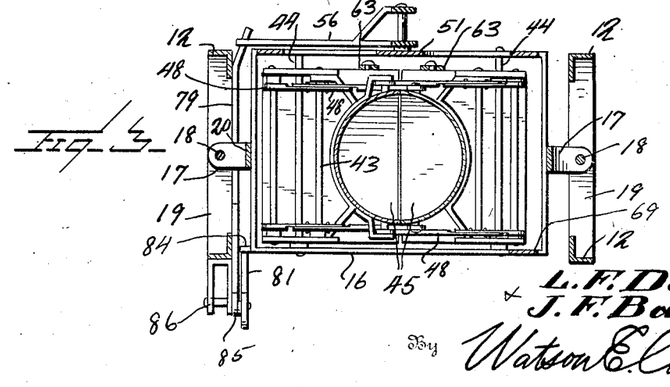
Figure 3 is a section on the line 3—3 of Figure 1.
Figures 4, 5, 6:
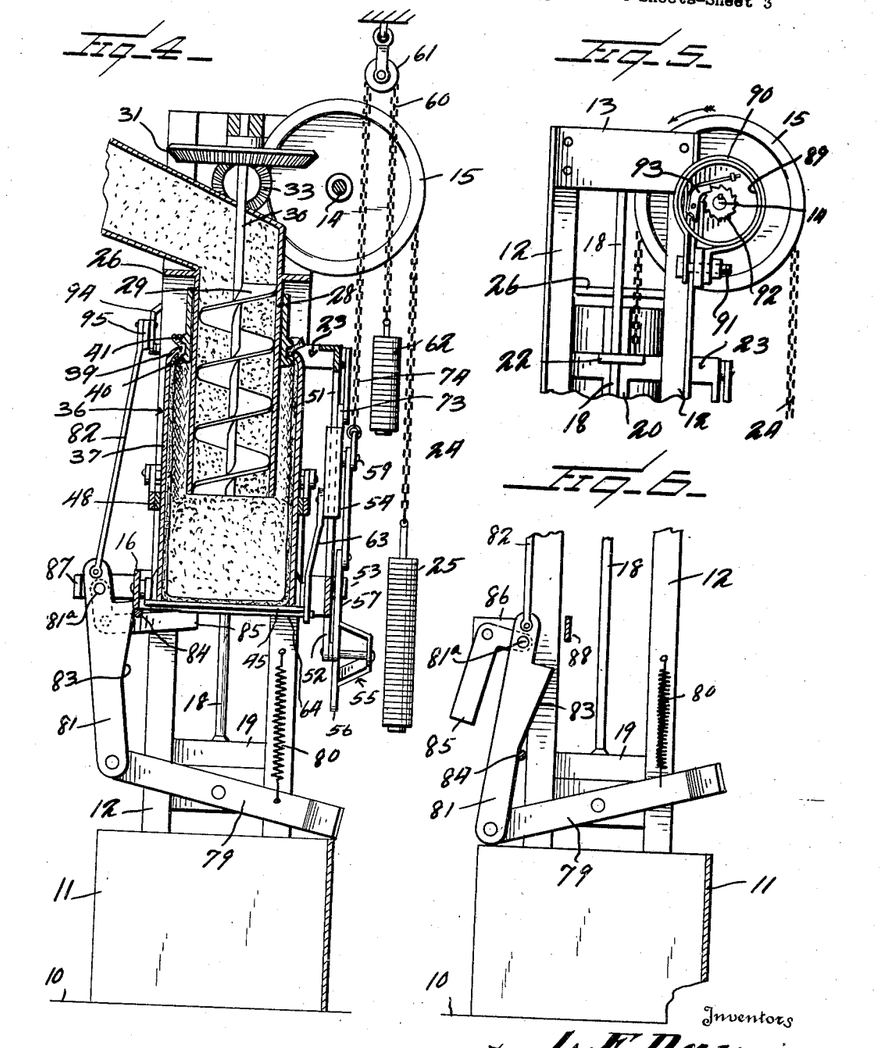
Figure 4 is a vertical section from front to rear.
Figure 5 is a fragmentary elevation of the upper portion of the machine.
Figure 6 is a fragmentary elevation of the lower portion of one side of the machine, the wall 11 being in section.
Figure 5:
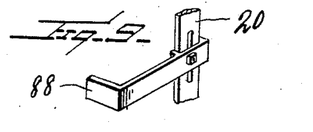
Figure 6:
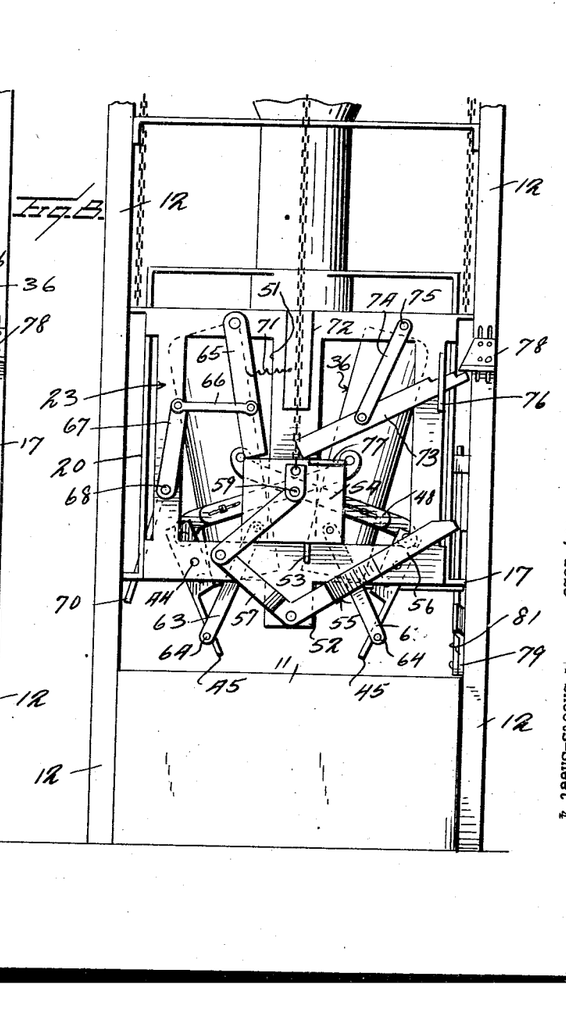

Associated with the shaft 14 is a brake, operating to resist the rotation of the shaft in a direction to lower the cage but inoperative when the shaft rotates in the opposite direction under the action of the cage-lifting weight. We do not wish to be limited to any particular construction of this brake but, as illustrated in Figure 5, the shaft 14 passes loosely through a brake drum 89 which is surrounded by a brake band 90, this band being held from rotation and being adapted to be clamped more or less tightly upon the drum. We have illustrated the band 90 extending around the brake drum and having one end attached to the adjacent post 12 and the other end extending down parallel to said last named end of the brake band and being engaged therewith by a bolt 91 or equivalent member. By tightening up upon this bolt, it is obvious that the brake band may be tightened upon the drum.

Mounted upon the shaft 14 is a ratchet wheel 92 and mounted upon the drum is a pawl 93 engaging said ratchet wheel. It will be obvious now that as the shaft 14 turns in the direction of the arrow in Figure 5, the pawl and ratchet teeth will engage and the drum will be rotated with the shaft against the friction of the brake band, but upon a rotation in the opposite direction, which will cause the lifting of the cage, the pawl will ride over the teeth of the ratchet wheel and the shaft will run free. We do not wish to be limited to any particular means whereby the clutch 36 may be shifted by the rod 82, but we have illustrated a pivoted shipper lever 94 operatively engaging the clutch and connected at its lower end to one link of a toggle 95, the rod 82 being connected to the toggle at the intersection of the links thereof. Any equivalent clutch shifting mechanism might be used, however.

The operation of this mechanism will be obvious from what has gone before. Assuming that the platform 16 with its cage is lowered and the sections 37 and 38 of the cage are opened, then an operator inserts a bag within the cage and places the upper end of the bag around the lower end of the sleeve 21. At this time the cage is held lowered by the projection of the locking dog 73 beneath the stop 78 and the cage is held open by the latch 65 engaging over the upper end of the slide 54. As soon as the operator has put the bag in position, he then shifts the handle 70 and that retracts the latch 65 from above the slide. This retraction of the latch permits the weight 62 to straighten the links 57 and 58, thus closing the cage and also, of course, closing the gates in the bottom of the cage. During this time, of course, the packing shaft 30 is not operating. As soon as the latch 73 is withdrawn, the cage moves upward under the action of the weight 25 and as this occurs the pin 84 engages with the edge 83 of the cam link 81, throwing this cam link outward until it bears against the stop 87. The weight 25 then acts to lift the cage upward and the cage moves upward on its guides until it reaches its uppermost position with the sleeve 21 nearly level with the top of the cylinder 28. The shifting of the cam link 81 throws the clutch into operation and causes a rotation of the packing screw and this screw, therefore, commences to pack material into the bag supported within the cage. As the screw continues to rotate, it forces the bag downward with the packed material therein and, of course, forces the platform downward against the action of the weight 25, the weight of the filled bag assisting.

When the bag has been completely filled, the platform will be lowered nearly to its initial position and when it nears this position the stop 88 will strike the horizontal arm of the bell crank lever 85, turning this horizontal arm downward into its vertical position and causing the cam link 81 to spring inward. At the same time the upwardly moving end of lever 79 will strike the projecting end of lever 56, causing the upward movement of this lever, the downward movement of the slide, the opening of the cage, the opening of the gates, and the discharge, of course, of the filled bag onto the base. This action, as before explained, will cause the projection of the bolt 73 which will lock the cage from any reverse movement until the operator has entirely actuated the controlling lever 70, whereupon the operation is repeated.

We do not wish to be limited to the use of the clutch controlling mechanism, as under some circumstances as, for instance, where an automatic scale is used, it is not necessary to use the clutch and the clutch rod may be entirely disconnected from the clutch mechanism, allowing the auger or screw 29 to run continuously, this being for the reason that the product being packed is not running into the packer cage continually but is being held in the scale hopper above until the desired weight to be packed has accumulated. Then the scale hopper turns and discharges the requisite amount of material into the bag. If, however, the automatic scale hopper is not used, it is necessary to use the gears and clutch previously described. The purpose of the brake mechanism engaged with the shaft 14 is to provide sufficient upward tension on the cage to counteract any desired weight that may be packed in the sack. Thus the greater the tension placed upon the brake, the greater the amount of weight which may be placed in the sack.

Figure 7:
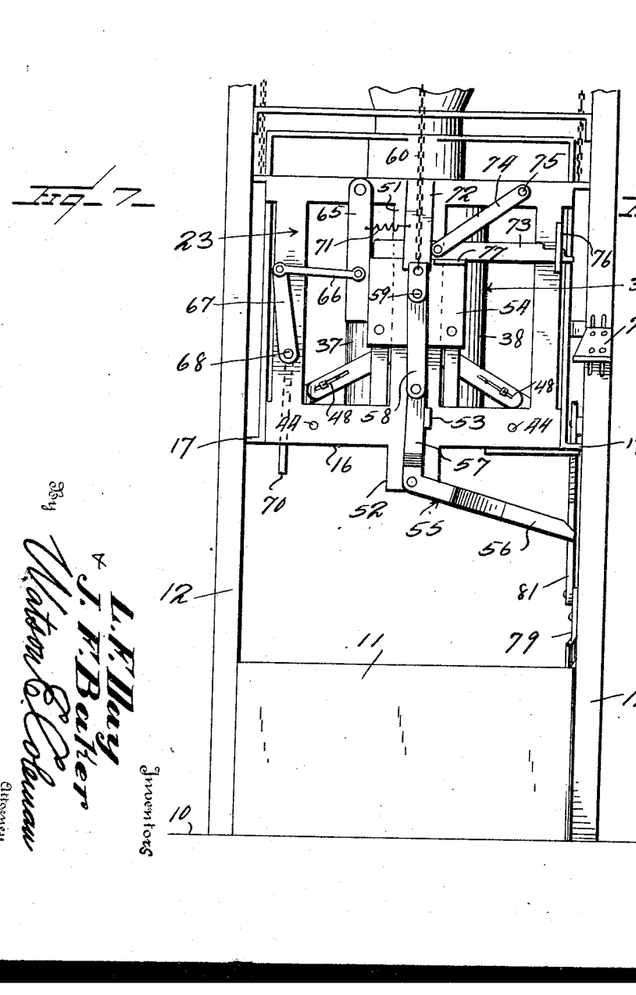
Figure 7 is a fragmentary rear elevation with the cage raised.

Attention is called to the fact that when the platform and the cage descends, the parts are in the position shown in Figure 7 and the arm 57 and the link 58 are in practically a straight line, thus preventing the weight of the bag from opening the gates and causing the descent of the slide 54, thus practically locking the gates in closed position. When the lever 79, however, strikes the lever 55 and shifts the lever 55 so as to break the joint between the arm 57 of the lever 55 and link 58, then just as soon as the pivotal connection between the link 58 and the arm 57 is moved slightly to the left and the joint is broken, the weight of the filled bag within the cage will act to open the gates and cause the full shifting of the parts to the position shown in Figure 8.

We claim:—

1. In a packer of the character described, a vertically movable cage formed in a plurality of sections mounted for movement toward or from each other, a feeding cylinder with which the cage coacts when it is raised, packing means disposed within the cylinder, means causing the upward movement of the cage, means for operating the packing means when the cage is elevated to cause a depression of the cage, and means for separating the sections of the cage when the cage is lowered to thereby permit the discharge of the contents thereof and closing the sections as the cage is raised.

2. In a packer of the character described, a vertically movable cage having bottom gates, a feeding cylinder over which the cage is adapted to telescope as it rises, packing mechanism disposed within the cylinder, means for causing the vertical movement of the cage, means for operating the packing means when the cage is elevated to cause the depression of the cage, and means for automatically opening the gates of the cage to discharge the contents thereof when the cage has been fully lowered and automatically closing the doors of the cage when the cage is about to rise.

3. In a packer of the character described, a cage adapted to receive a bag and formed in a plurality of sections mounted for movement toward and from each other, and means acting to separate the sections from each other when the bag has been fully loaded.

4. In a packer of the character described, a cage formed in two sections and having gates at its lower end, means above the cage with which the cage coacts when it is raised to feed material into the cage to cause the descent thereof, and means acting automatically to open said gates and simultaneously separate the sections of the cage when the cage has reached its lowered position to thereby discharge the contents of the cage.

5. In a packer of the character described, a feeding cylinder, a sleeve telescoping over said feeding cylinder and having two spaced collars, and a cage formed in a plurality of sections, the upper ends of the sections being inwardly turned to engage between said collars when the sections are closed to thereby clamp the mouth of a bag between the upper ends of the sections and said collars.

6. In a packer of the character described, a feeding cylinder, a cage disposed below the feeding cylinder, the cage being formed in a plurality of sections, each having an inwardly turned upper end, a sleeve loosely surrounding the packing cylinder and having spaced collars at its lower end between which the inwardly turned ends of the sections engage when the sections are closed to thereby hold the mouth of a bag between the sections and the collars, the lower end of the cage having downwardly swinging gates, means for raising the cage and the sleeve with relation to the packing cylinder, means for causing the descent of the cage and sleeve as the bag fills, and means for automatically opening said gates to permit the discharge of the filled bag from the cage and automatically separating the sections to permit the insertion of a new bag when the cage has fully descended.

7. In a packer of the character described, a feeding cylinder, a cage disposed below the feeding cylinder, the cage being formed in a plurality of sections, each having an inwardly turned upper end, a sleeve loosely surrounding the packing cylinder and having spaced collars at its lower end between which the inwardly turned ends of the sections engage when the sections are closed to thereby hold the mouth of a bag between the sections and the collars, the lower end of the cage having downwardly swinging gates, means for raising the cage and the sleeve with relation to the packing cylinder, means for causing the descent of the cage and sleeve as the bag fills, means for automatically opening said gates to permit the discharge of the filled bag from the cage and automatically separating the sections to permit the insertion of a new bag when the cage has fully descended, yielding means urging the sections into closed position and the gates into closed position, yielding means urging the cage and sleeve upward with relation to the packing cylinder, means for automatically locking the sections and the gates in their open positions when the cage has been fully lowered, and manually operable means for releasing said locking means to permit the upward movement of the cage.

8. A packer including a vertically moving cage, a packing cylinder disposed above the cage, the cage being formed of two opposed hinged sections and the bottom of the cage having downwardly swinging gates normally held in a closed position, means urging the cage upward, means for causing the downward movement of the cage as the container within the cage is filled, means automatically causing the opening of said sections and of said gates when the cage reaches a lowered position and automatically locking the cage in its open position and preventing upward movement of the cage, and manually operable means for releasing the locking means to permit the closing of the cage sections and the upward movement of the cage.

9. A packer of the character described including a packing cylinder, a vertically movable cage disposed below the packing cylinder, the cage being formed with a plurality of hinged sections, each section having inwardly turned upper ends, means urging the sections to a closed position, a sleeve loosely surrounding the packing cylinder and movable thereon and having spaced annular collars between which the upper ends of the sections are engaged when the sections are closed to thus support the mouth of a bag around the lower end of the sleeve and the body of the bag within the cage, gates closing the lower end of the cage and downwardly movable to permit the discharge of the bag, means urging the cage upward, feeding means disposed within the feeding cylinder and in its operation causing the downward movement of the cage as the bag therein is filled, means automatically causing the opening of the cage sections when the cage reaches its lowered position and the simultaneous opening of said gates to discharge the contents of the cage, means locking the cage, the sections, and the gates in open position and locking the cage from upward movement, and manually operable means for releasing the locking means to permit the closing of the cage sections and gates and the upward movement of the cage.

10. A packer of the character described including a packing cylinder, a vertically movable cage disposed below the packing cylinder and formed of two opposed sections, the upper ends of the sections being inwardly turned, a sleeve telescoping upon the packing cylinder and at its lower end having means coacting with the inwardly turned ends of the sections to grip the mouth of a bag supported within the cage, gates normally closing the lower end of the cage and operatively connected to the sections to open when the sections are opened and close when the sections close, means yieldingly urging the sections to a closed position, means urging the cage upward, means operating within the packing cylinder for causing the filling of the bag disposed within the cage and the consequent lowering of the cage, means automatically causing the opening of the cage sections and of said gates when the cage reaches a lowered position and locking the cage open and locking the cage from upward movement, and manually operable means for releasing the locking means to permit the closing of the cage and the upward movement thereof.

11. A packer including a supporting frame, a packing cylinder mounted upon the frame adjacent the upper end thereof, packing means operating within the cylinder, a vertically movable cage mounted upon said frame below the cylinder, the cage being formed in sections and having normally closed gates, means for supporting a bag within the cage, connecting means between the sections of the cage and the gates to cause the simultaneous closing or opening movement thereof, means urging the cage upward, means acting upon an upward movement of the cage to cause the operation of the packing mechanism, means stopping the operation of the packing mechanism when the cage is lowered a predetermined extent under the weight of the load within the cage, means causing the opening of the cage and its gates when the cage reaches a lowered position to thereby permit the discharge of the filled bag through the gates, means automatically locking the sections of the cage open and locking the cage from upward movement when the cage has reached its discharge position and has been opened, means urging the sections of the cage to a closed position against the action of said locking means, and manually operable means for releasing the locking means to permit the closing of the cage and the upward movement of the cage.

12. A packer including a supporting frame, a packing cylinder mounted upon the frame adjacent the upper end thereof, packing means operating within the cylinder, a vertically movable cage mounted upon said frame below the cylinder, the cage being formed in sections and having normally closed gates, means for supporting a bag within the cage, connecting means between the sections of the cage and the gates to cause the simultaneous closing or opening movement thereof, means urging the cage upward, means acting upon an upward movement of the cage to cause the operation of the packing mechanism, means stopping the operation of the packing mechanism, when the cage is lowered a predetermined extent under the weight of the load within the cage, means causing the opening of the cage and its gates when the cage reaches a lowered position to thereby permit the discharge of the filled bag through the gates, means automatically locking the sections of the cage open and locking the cage from upward movement when the cage has reached its discharged position and has been opened, means urging the sections of the cage to a closed position against the action of said locking means, manually operable means for releasing the locking means to permit the closing of the cage and the upward movement of the cage, and adjustable means for adjustably resisting downward movement of the cage.

13. A packer of the character described including a packing cylinder, a vertically movable cage disposed beneath the packing cylinder and movable upward into operative engagement therewith and downward out of such operative engagement, the cage comprising opposed hinged sections and having hinged gates at its lower end, means causing the closing of the gates when the sections are closed, means yieldingly urging the sections to a closed position, packing means disposed within the packing cylinder, means yieldingly urging the cage upward, means acting upon an upward movement of the cage to automatically connect the packing means with a source of power and to disconnect the packing means from the source of power when the cage has lowered to a predetermined point, means acting automatically when the cage has fully lowered to open the sections of the cage and the gates to discharge the contents of the cage, means automatically locking the cage in its lowered position and locking the sections of the cage in their open position when the cage has been fully lowered, and manually operable means for releasing said locking means to thereby permit the closing of the cage sections and gates and the upward movement of the cage.

14. A packer of the character described including an elevated packing cylinder, a vertically movable platform disposed below the packing cylinder, a cage mounted upon said platform and consisting of two opposed sections hinged to the platform, the upper ends of the sections extending inward, a sleeve telescoping upon the cylinder and with which the inwardly turned upper ends of the sections engage, means for raising and lowering the platform, gates pivoted midway of their ends upon the platform and adapted to close the lower end of the cage, links pivoted to each section of the cage, the links crossing each other being pivoted to the gates outward of the pivots thereof whereby as the sections are opened the gates open and as the sections are closed the gates close, means for causing the opening of the gates and of the sections when the platform has been lowered to its full extent, and means for closing the gates and sections as the platform moves upward.

15. A packer of the character described including an elevated packing cylinder, a vertically movable platform disposed below the packing cylinder, a cage mounted upon said platform and consisting of two opposed sections hinged to the platform, the upper ends of the sections extending inward, a sleeve telescoping upon the cylinder and with which the inwardly turned upper ends of the sections engage, means for raising and lowering the platform, gates pivoted midway of their ends upon the platform and adapted to close the lower end of the cage, links pivoted to each section of the cage, the links crossing each other and being pivoted to the gates outward of the pivots thereof whereby as the sections are opened the gates open and as the sections are closed the gates close, means for opening the gates and sections when the platform is lowered, means for locking the platform in its lowered position and locking the gates and sections in their open position, manually operable means for releasing the platform and simultaneously releasing the gates and sections to permit them to close, means for raising the platform, and means for causing the downward movement of the platform as the cage is filled.

16. In a bag packing machine of the character described, a cage formed of coacting sections and adapted to contain a bag, the upper ends of the sections being inwardly turned, a sleeve coacting with the cage and having upper and lower outwardly projecting portions between which the inwardly turned ends of the sections are adapted to engage and clamp the mouth of a bag, and means for closing and opening the sections.

17. A packer of the character described including an expansible and contractible cage, gates normally closing the bottom of the cage, means for clamping the bag within the cage with the mouth above the upper end of the cage, and means for simultaneously opening the gates and expanding said cage to permit the removal of the bag and the insertion of a fresh bag and simultaneously closing the sections upon the bag and closing said gates.

18. A packer of the character described including a platform, a bag receiving cage mounted upon the platform and composed of sections, gates normally closing the bottom of the cage, means yieldingly urging the sections toward each other and the gates into closed position, a packing cylinder with which the cage coacts, the cage being movable toward or from the packing cylinder to receive or discharge the contents of the cage, means for lowering the cage from the packing cylinder and at a predetermined point causing the opening of the sections and of the gates to discharge the filled bag from the cage, means for automatically locking the platform in its lowered position and the cage in its open position when the platform has lowered to a predetermined point, and manually operable means for releasing said locking means to permit the upward movement of the cage to the feeding cylinder and simultaneously unlocking said sections and gates to permit the gates and sections to close.

19. A packer including vertical supports, a packing cylinder mounted upon the upper ends of the supports, packing means in said cylinder, driving means for the packing means including a driving shaft having a clutch, a platform mounted upon the supports for vertical movement toward or from the packing cylinder, a cage mounted upon the platform and formed of sections, gates normally closing the lower end of the cage, means for simultaneously opening the gates and the sections or closing the gates and sections, means urging the sections in closed position and gates in closed position, means urging the platform to a raised position to bring the cage into coactive relation to the packing cylinder, means automatically opening the gates and the sections when the platform is lowered to a predetermined position, means for locking the platform in its lowered position, manually operable means for releasing said locking means to permit the platform to move upward and the gates and sections to close, means acting upon a descent of the platform to release said clutch to thereby stop the operation of the feeding means, and means acting automatically as the platform moves upward to shift the clutch into operative position to thereby start the operation of the packing means, the filling of the cage with material acting to depress the cage to its initial discharge position.

20. A packer including vertical supports, a packing cylinder mounted upon the upper ends of the supports, packing means in said cylinder, driving means for the packing means including a driving shaft having a clutch, a platform mounted upon the supports for vertical movement toward or from the packing cylinder, a cage mounted upon the platform and formed of sections, gates normally closing the lower end of the cage, means for simultaneously opening the gates and the sections or closing the gates and sections, means urging the sections in closed position and gates in closed position, means urging the platform to a raised position to bring the cage into coactive relation to the packing cylinder, means automatically opening the gates and the sections when the platform is lowered to a predetermined position, means for locking the platform in its lowered position, manually operable means for releasing said locking means to permit the platform to move upward and the gates and sections to close, an operating rod connected to the clutch, a cam pivotally connected to the supports and disposed in the path of movement of the platform, said platform as it moves upward engaging said cam to shift the clutch to connect the packing means with the power, the platform upon its descent operatively engaging said cam to shift the clutch to a position releasing engagement between the source of power and said drive shaft.

In testimony whereof we hereunto affix our signatures.

LUTHER F. DAY.
JESSE F. BAKER.